(12) United States Patent
Kheria et al.

(10) Patent No.: US 12,001,352 B1
(45) Date of Patent: Jun. 4, 2024

(54) TRANSACTION ORDERING BASED ON TARGET ADDRESS

(71) Applicant: Amazon Technologies, Inc., Seattle, WA (US)

(72) Inventors: Rashika Kheria, San Jose, CA (US); Ron Diamant, Santa Clara, CA (US); Se Wang Oh, Campbell, CA (US); Guy Nakibly, Kedumim (IL)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/937,395

(22) Filed: Sep. 30, 2022

(51) Int. Cl.
  *G06F 13/16* (2006.01)
  *G06F 9/46* (2006.01)

(52) U.S. Cl.
  CPC .......... *G06F 13/1621* (2013.01); *G06F 9/466* (2013.01)

(58) Field of Classification Search
  CPC .............................. G06F 9/466; G06F 13/1621
  See application file for complete search history.

(56) References Cited

U.S. PATENT DOCUMENTS

| | | | |
|---|---|---|---|
| 7,286,548 B1 | 10/2007 | Jair et al. | |
| 9,985,903 B2 | 5/2018 | Shalev et al. | |
| 10,452,575 B1 * | 10/2019 | Ringe | G06F 13/1668 |
| 10,949,365 B2 | 3/2021 | Jacobs et al. | |
| 11,354,258 B1 | 6/2022 | Kaplan et al. | |
| 11,409,685 B1 | 8/2022 | Kaplan et al. | |
| 11,467,992 B1 | 10/2022 | Kaplan et al. | |
| 2004/0010612 A1 | 1/2004 | Pandya | |
| 2004/0093411 A1 | 5/2004 | Elzur et al. | |
| 2006/0136570 A1 | 6/2006 | Pandya | |
| 2006/0236063 A1 | 10/2006 | Hausauer et al. | |
| 2006/0256784 A1 | 11/2006 | Feng et al. | |
| 2006/0259661 A1 | 11/2006 | Feng et al. | |
| 2009/0077567 A1 | 3/2009 | Craddock et al. | |
| 2009/0254647 A1 | 10/2009 | Elzur et al. | |
| 2012/0102293 A1 * | 4/2012 | Negishi | G06F 13/1626 711/E12.078 |
| 2013/0198538 A1 | 8/2013 | Diab et al. | |
| 2015/0039712 A1 | 2/2015 | Frank et al. | |

(Continued)

OTHER PUBLICATIONS

Daoud, F., & Romanovsky, L., "Asynchronous Peer-to-Peer Device Communication", OpenFabrics Alliance 13th Annual Workshop, Mar. 28, 2017, 26 pages.

(Continued)

*Primary Examiner* — Edward J Dudek, Jr.
(74) *Attorney, Agent, or Firm* — Weaver Austin Villeneuve & Sampson LLP

(57) ABSTRACT

Techniques are provided to maintain data coherency for data transfers among data processing devices in a distributed computing environment. A data buffer in each data processing device can be mapped to an address range that is assigned to transactions that allow out-of-order completions, and a message buffer in each data processing device can be mapped to an address range that is assigned to transactions that follow transaction ordering. Thus, a transaction to store a set of data into the data buffer is completed before a transaction to write a synchronization message in the message buffer indicating that the set of data is stored in the data buffer based on the mapping irrespective of the transaction ordering indicated by each transaction.

20 Claims, 8 Drawing Sheets

(56) References Cited

U.S. PATENT DOCUMENTS

| | | |
|---|---|---|
| 2015/0088483 A1 | 3/2015 | Aarts et al. |
| 2017/0187621 A1 | 6/2017 | Shalev et al. |
| 2017/0346596 A1 | 11/2017 | Desimone et al. |
| 2018/0102978 A1 | 4/2018 | Shen et al. |
| 2018/0287869 A1 | 10/2018 | Munafo et al. |
| 2019/0171612 A1 | 6/2019 | Shahar et al. |
| 2019/0303297 A1 | 10/2019 | Fleming, Jr. et al. |
| 2019/0347125 A1 | 11/2019 | Sankaran et al. |
| 2019/0392297 A1 | 12/2019 | Lau et al. |
| 2020/0081850 A1* | 3/2020 | Singh .................. G06F 13/1673 |
| 2020/0151104 A1 | 5/2020 | Yang |
| 2020/0174840 A1 | 6/2020 | Zhao et al. |
| 2020/0178198 A1 | 6/2020 | Ding et al. |
| 2020/0242258 A1 | 7/2020 | Smith et al. |
| 2020/0314181 A1 | 10/2020 | Eran et al. |
| 2020/0334195 A1 | 10/2020 | Chen et al. |
| 2021/0076275 A1 | 3/2021 | Yiu et al. |
| 2021/0117360 A1 | 4/2021 | Kutch et al. |
| 2021/0149441 A1 | 5/2021 | Bartscherer et al. |
| 2022/0114137 A1* | 4/2022 | Lee ........................ G06N 3/006 |

OTHER PUBLICATIONS

U.S. Final Office Action dated Dec. 9, 2021 in U.S. Appl. No. 17/031,653.

U.S. Non-Final Office Action dated Jul. 12, 2021 in U.S. Appl. No. 17/031,653.

U.S. Notice of Allowance dated Mar. 22, 2022 in U.S. Appl. No. 17/031,653.

* cited by examiner

US 12,001,352 B1

TRANSACTION ORDERING BASED ON TARGET ADDRESS

BACKGROUND

Distributed computing systems may include computing devices that can communicate and exchange data over the network. Each computing device may include a plurality of data processing devices to perform computations on the data, and a plurality of network devices to exchange the data with other computing devices. Through parallelism, a distributed computing system can substantially reduce the time needed to complete computation operations, especially on large volumes of data, which can lead to a substantial performance improvement for certain applications that demand high bandwidth and performance.

BRIEF DESCRIPTION OF THE DRAWINGS

Various embodiments in accordance with the present disclosure will be described with reference to the drawings, in which.

DETAILED DESCRIPTION

Figure 1:
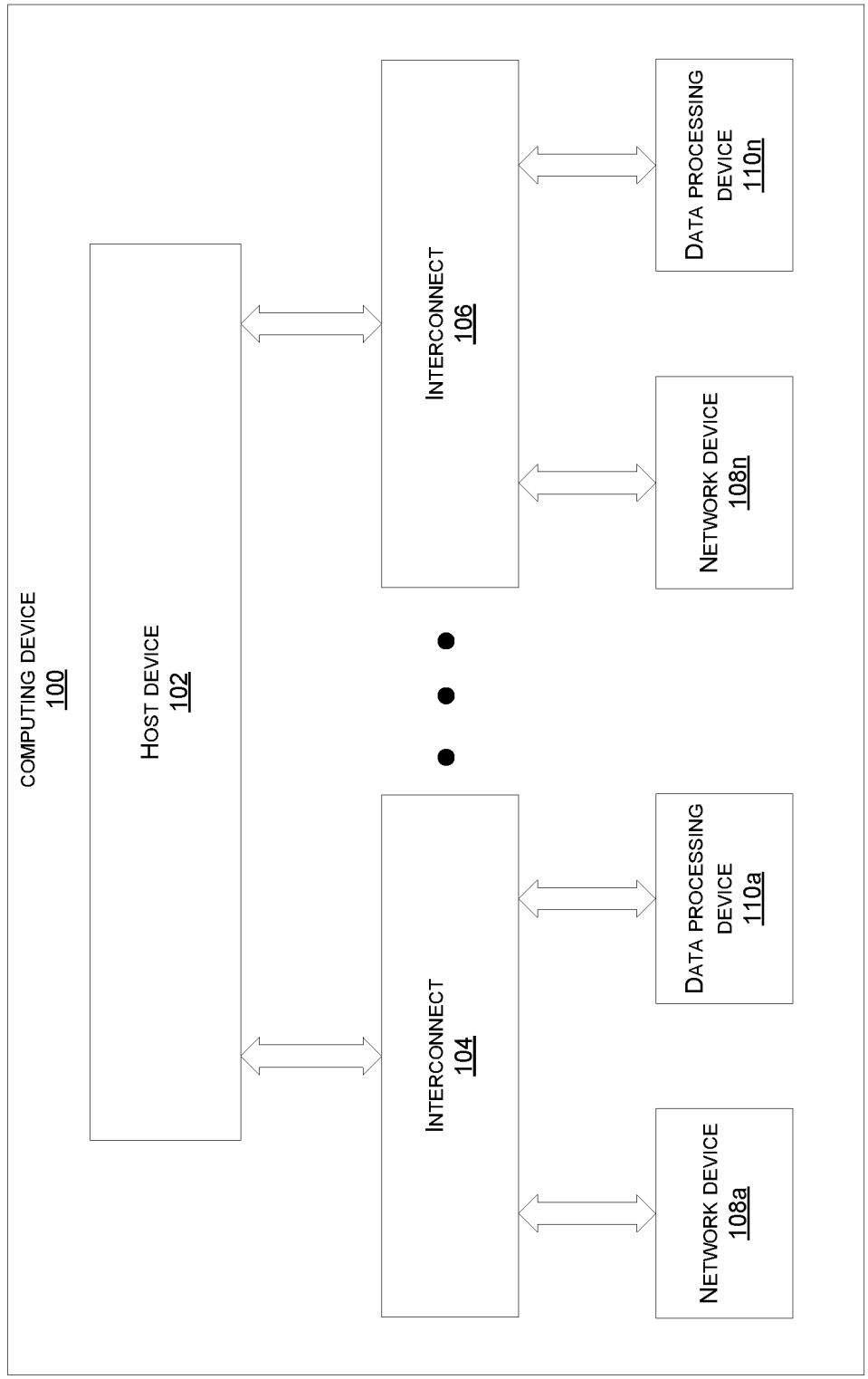
FIG. 1 illustrates a computing device comprising a host device coupled to a plurality of network devices and data processing devices via one or more interconnects.

A distributed computing system typically includes a cluster of inter-networked computing devices, in which each computing device can communicate and exchange data with each other to support a computation operation. Through parallelism, a distributed computing system can substantially reduce the time needed to complete the computation operation, especially a computation operation that operates on a large volume of data. Specifically, the computation operation can be split into multiple sub-operations, with each sub-operation operating on a subset of the data. Each computing device can receive a subset of the data from the network and perform the sub-operation on the subset of the data in parallel to generate the output. As a result of the parallel processing, the time required to complete the computation operation can be substantially reduced compared with a case where the sub-operations are performed sequentially at a large computing device, which can lead to a substantial performance improvement.

In some implementations, each computing device may include a host device that is coupled to a plurality of data processing devices and a plurality of network devices via one or more interconnects, such as Peripheral Component Interconnect express (PCIe) switches. The data processing device may include an accelerator device (e.g., a neural network accelerator, a cryptographic accelerator), a graphics processing unit (GPU), or another device that is configured to perform large number of computations on data. Each computing device may be part of a server computer or a node, and multiple such server computers/nodes can be connected via one or more networks in a distributed computing environment to support applications that demand high bandwidth and performance, e.g., machine learning, artificial intelligence, gaming, cloud computing, etc.

Different computing devices may exchange data over a network via the corresponding network devices. A network device may receive a set of data from another computing device via the network and forward the set of data to the data processing device via the interconnect, which can be used by the data processing device for further computations. For example, the network device can send, via the interconnect, a write request with the set of data to the data processing device to store the set of data into a local memory of the data processing device to be used for future computations. The local memory may include a data buffer to store the data for computations, and a message buffer to store various messages/requests. Some systems can support network devices that write to or read from the local memory of the data processing device directly without going through the host processor, which can reduce unnecessary memory copies and latency, and improve system performance.

In some implementations, after sending the set of the data to the data processing device to be stored in the data buffer, the network device can send a write completion message to the host processor via the interconnect indicating that the set of data has been sent to the data processing device. Upon receiving the write completion message, the host processor can send a synchronization message to the data processing device via the interconnect indicating that the set of data may be available in the local memory of the data processing device so that the data processing device can start using the set of data for computations.

In some implementations, the network device, the host device, and the data processing device may communicate with one another via queues or messages. The messages can be sent via direct memory access (DMA) operations using DMA descriptors. For example, the network device may send the write completion message to the host device by writing to a specific memory location in the host address space, which may be configured to store the write completion message. Similarly, the host device may send the synchronization message to the data processing device by writing to a specific memory location in the address space for the message buffer in the data processing device configured to store the synchronization message.

In some instances, due to different latencies through the interconnect and through the data processing device, a race condition may exist between the arrival of the set of data received from the network device and the synchronization message received from the host processor, and it is possible that the synchronization message can be written into the message buffer before the complete set of data has been written into the local memory of the data processing device. For example, the interconnect may also be connected to other devices in the computing system, e.g., memory devices, peripheral devices, input/output (I/O) controllers, or other interconnects, which can introduce latency in the datapath through the interconnect if the interconnect is busy servicing these other components.

In some cases, it may take some time for the set of data to go through the internal datapath of the data processing device, before it is actually stored to the data buffer. Thus, in some cases, transfer of the set of data to the data buffer of the data processing device may be slower than the transfer of the synchronization message, and the synchronization message may reach the data processing device before the complete set of data has been written into the data buffer. In such cases, upon receiving the synchronization message, the data processing device may start performing computations with the data stored in the data buffer, which may be stale, incorrect, or incomplete.

Some systems may rely on the transaction ordering rules to force the completion of different transactions in a desired order. In some systems, the transactions may be performed using transaction layer packets (TLP) based on the PCIe protocol, which may allow enabling or disabling different ordering rules for each transaction. For example, each TLP may include a TLP header comprising a relaxed ordering (RO) field and an ID-based ordering (IDO) field, which can be enabled/disabled to control the ordering of the transaction accordingly. When the RO field and the IDO field are disabled (e.g., set to 0), it indicates strong ordering (SO) for the write transactions indicating that all the outstanding transactions prior to the given transaction have to be completed in the order of issuance.

In some implementations, a first TLP for a set of first transactions sent by the network device with the write request to store the set of data into the data buffer of the data processing device can include the RO/IDO bits disabled (e.g., SO is enabled). Similarly, a second TLP for a second transaction sent by the network device to the host device with the write completion message can also have SO enabled. Lastly, a third TLP for a third transaction sent by the host device to the data processing device with the synchronization message can also have the SO enabled. The interconnect may adhere to the ordering rules by allowing the TLPs to go through in the order they were issued originally. Thus, the first TLP should go through the interconnect before the second TLP and the second TLP should go through the interconnect before the third TLP, which can ensure that the synchronization message will be issued by the host device after receiving the write completion message, and the synchronization message will reach the data processing device after the set of data has been transferred to the data buffer.

However, the write request can be a posted write request, and the interconnect may indicate completion of the write request as soon as it has been posted, even though not all of the data has been written into the data buffer of the data processing device. In such cases, even with the set of first transactions, the second transaction, and the third transaction having SO enabled, the race condition may still exist, since some of the data may reach the data buffer after the synchronization message has been stored due to latencies in the internal datapath of the data processing device. Thus, even though the interconnect may maintain the strong ordering rules to transfer the synchronization message after the set of data, it may not necessarily guarantee that the data stored in the data buffer of the data processing device is the correct data.

One possible solution is to perform a dummy read from the data buffer of the data processing device before issuing the write completion to the host device, which can enforce completion of the write request by storing the set of data into the data buffer. For example, the PCIe ordering rules for read requests may enforce flushing all the previous write requests that were issued to the same interface when a read request is issued to that interface following the write requests. Thus, the network device can issue a dummy read request to any address in the data buffer after sending the write request, which can guarantee that the complete set of data is stored in the data buffer. Once the read request is completed, the network device can send the write completion message to the host device, which can trigger the host device to issue the synchronization message to the data processing device indicating that the set of data is available in the data buffer to be used for computations. However, this solution may add extra complexity in the software as well as additional latency, since the network device may have to issue an extra transaction to perform the dummy read request.

In some systems, the data buffer in the data processing device can be implemented with a parallelized interface to increase memory bandwidth and optimize performance. For example, the data buffer can be implemented using high bandwidth memory (HBM) to support parallel memory accesses. To fully utilize the parallelized interface for high performance, a memory controller of the data processing device may parallelize the SO enabled transactions, which can also introduce a race condition with the synchronization message.

The techniques described herein can be used to ensure that the write request issued by the network device to store the set of data in the data buffer and the write request issued by the host device with the synchronization message are completed in the correct order so that the data processing device has the correct and complete set of data for computations as intended. The embodiments can be used to enforce transaction ordering based on the target address of each transaction irrespective of the transaction ordering indicated by the given transaction. In various embodiments, different portions of the local memory of the data processing device can be mapped to different address ranges that are assigned to specific transaction ordering semantics. Thus, the data processing device can treat each incoming transaction based on the mapping of the target address to a corresponding transaction ordering that has been assigned. For example, the data buffer in the data processing device can be mapped to a first address range that is assigned to transactions that allow out-of-order completion (e.g., relaxed order) and the message buffer in the data processing device can be mapped to a second address range that is assigned to transactions that do not allow out-of-order completion and follow transaction ordering (e.g., strong order). Thus, the transactions to write the set of data in the data buffer can be treated as RO enabled transactions, and the transaction to write the synchronization message can be treated as an SO enabled transaction.

When the data processing device receives a set of first transactions with the write request to store the set of data in the data buffer, it may treat the set of first transactions as RO enabled transactions based on the target address of the set of first transactions corresponding to the address range for RO enabled transactions independent of the transaction ordering indicated by the TLP of the set of first transactions. Similarly, when the data processing device receives a second transaction with the synchronization message, it may treat the second transaction as an SO enabled transaction based on the target address of the second transaction corresponding to the address range for SO enabled transactions independent of the transaction ordering indicated by the TLP of the second transaction.

Thus, even if the second transaction arrives before the set of first transactions is executed, the data processing device may not release the second transaction for execution to ensure that all the outstanding transactions issued before the second transaction are completed by storing the set of data in the data buffer. This can ensure that the set of data will be stored in the data buffer in the data processing device before the synchronization message is written to the message buffer. Writing the synchronization message to the message buffer may indicate to the data processing device that the set of data is available in the data buffer to be used for computations.

In various embodiments, the transaction ordering of certain transactions can be overwritten based on the mapping to different address ranges. Thus, the transactions to write the data into the data buffer (e.g., HBM) can be RO enabled, which can allow the data processing device to utilize the parallel interface for memory accesses without compromising the performance, and the transaction with the synchronization message can be SO enabled to ensure that the synchronization message is written to the message buffer after the set of data is stored in the data buffer without encountering the race condition.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

FIG. 1 illustrates a computing device 100 comprising a host device coupled to a plurality of network devices and data processing devices via one or more interconnects. The computing device 100 can be a server computer or a node in a distributed computing environment comprising a plurality of server computers/nodes.

The computing device 100 may include a host device 102 coupled to N network devices 108a-108n and N data processing devices 110a-110n via interconnects 104-106. For example, N can be 2, 4, 8, or more. As shown in FIG. 1, the host device 102 may be coupled to a network device 108a and a data processing device 110a via an interconnect 104, and to a network device 108n and a data processing device 110n via an interconnect 106. In various implementations, the interconnects 104-106 may include switches, fabrics, bridges, etc., based on any suitable bus protocol, e.g., Peripheral Component Interconnect express (PCIe). In some implementations, the interconnects 104, 106 may include PCIe switches coupled to a PCIe root complex implemented in the host device 102.

The computing device 100 can be part of a distributed computing system comprising a plurality of such computing devices 100. Each computing device may be configured to exchange data with other computing devices via corresponding network devices 108a-108n. The host device 102 may be configured to execute an operating system kernel as well as other applications that use the computation resources provided by the data processing device 110a-110n. As an example, a machine learning training application executing on the host device 102 may perform computations on multiple data processing devices using distributed training operations and synchronize the results over the network before starting another training iteration. Results of the computations can be exchanged over the network via corresponding network devices.

Each network device 108a-108n may be configured to provide a network interface to communicate with a remote computing device via a network. For example, each network device 108a-108n can send data computed by the corresponding data processing device 110a-110n to a remote data processing device via the network. Each network device 108a-108n can also receive data, via the network, that has been computed by a remote data processing device, and transmit the received data to the corresponding data processing device 110a-110n for further computations. In some implementations, each network device 108a-108n may be implemented using various queues to manage sending and receiving data and messages to and from other components of the computing device 100 or the remote computing device. Each network device 108a-108n may also include ports, a DMA controller, Media Access Control (MAC) unit, transmitter, receiver, and other suitable components to perform the intended functionality. Some embodiments can allow the network devices 108a-108n to bypass the operating system and transfer the data received via the network to local memories of corresponding data processing devices 110a-110n using direct memory access. Each network device 108a-108n may also be configured to communicate with the host device 102 to indicate a host application executing on the host device 102 that it has received the data from the network so that the host application can trigger the data processing devices to start computations for the next iteration.

Each data processing device 110a-110n may include a computing engine to provide dedicated computing resources to support certain data processing applications. For example, the computing engine may include a neural network hardware accelerator, a cryptographic accelerator, or a graphics processing unit (GPU), etc. Each data processing device 110a-110n may also include a local memory to support the computing engine, which can be accessible to the host device 102, and to the network devices 108a-108n. The local memory may include data buffers, message buffers, registers, or queues, among other memory types.

The ability of the network devices 108a-108n to directly write the local memory of the data processing devices 108a-108n may demand proper synchronization with the host application in order to ensure that when a data processing device 108a-108n is notified to use the data written by the network device for subsequent computations, the data processing device has the correct and complete data available. This is further explained with reference to FIG. 2.

Figure 2:
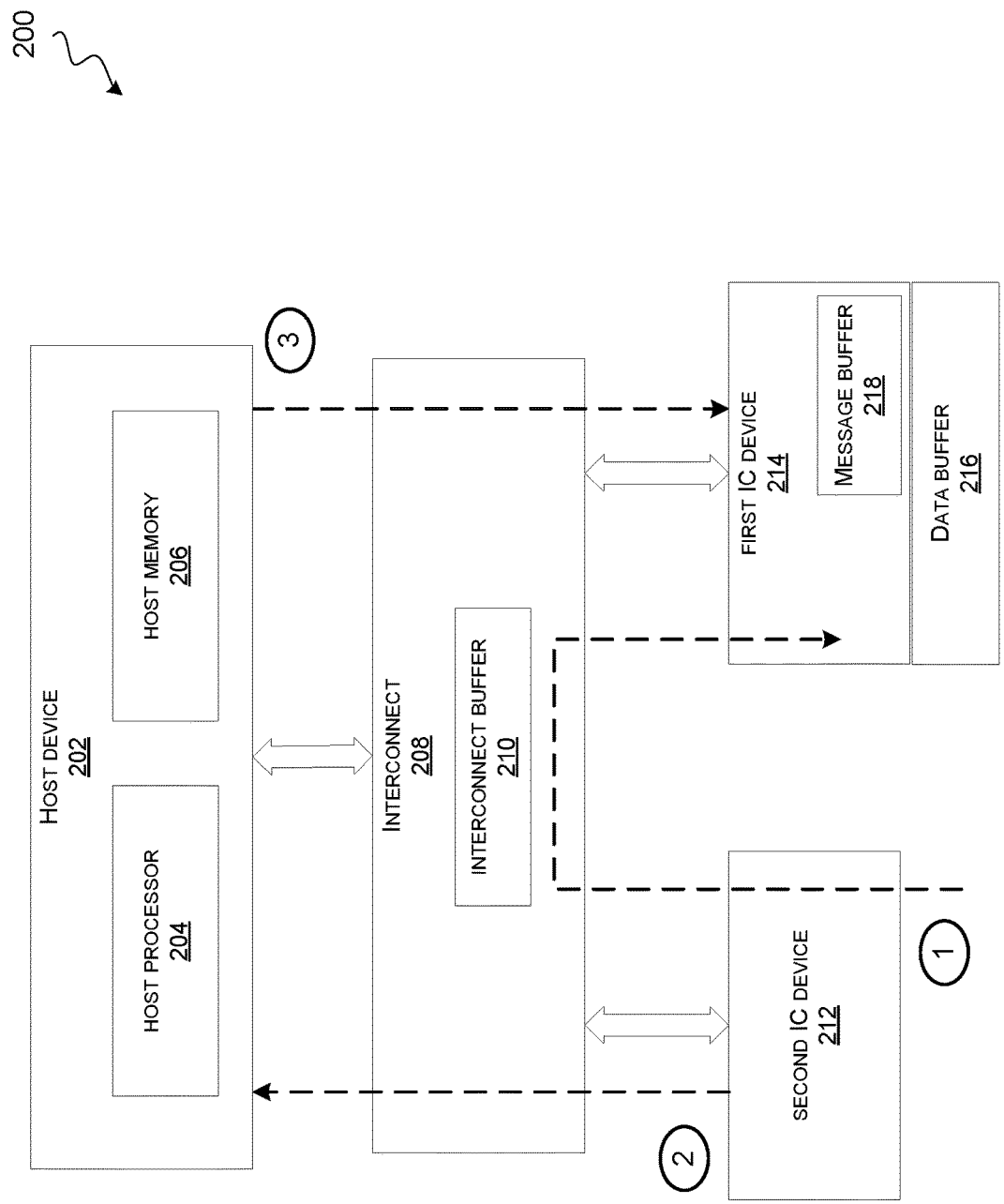
FIG. 2 illustrates an apparatus comprising a host device coupled to a first integrated circuit (IC) device and a second IC device via an interconnect.

FIG. 2 illustrates an apparatus 200 comprising a host device 202 coupled to a first IC device 214 and a second IC device 212 via an interconnect 208. The apparatus 200 can be part of the computing device 100 described with reference to FIG. 1, and the host device 202 can be an example of the host device 102.

The host device 202 may be coupled to the second IC device 212 and the first IC device 214 via the interconnect 208. For example, the interconnect 208 can be one of the interconnects 104-106, the second IC device 212 can be one of the network devices 108a-108n and the first IC device 214 can be one of the corresponding data processing devices 110a-110n coupled to a same peripheral switch of the interconnect 208. Note that some embodiments are described using the network device and the data processing deices; however, it will be noted that the techniques described herein can be used for any PCI device that can communicate with one another and with a host device via a PCI switch.

The host device 202 may include a host processor 204 and a host memory 206. The host processor 204 may be configured to execute an operating system kernel as well as other applications that use the computation resources provided by the first IC device 214. For example, the host processor 204 may execute a training application that controls the first IC device 214 to perform batches of distributed training operations. In another example, the host processor 204 may execute an image recognition application that uses the first IC device 214 to perform an inference operation using a neural network with weights obtained from the distributed training operations. The host memory 206 may provide memory resources to support the operation of the host processor 204 as well as the first IC device 214. For example, the host memory 206 can be used to store the input data for training, inference operations, etc., which can be transferred to the data processing device 114 via DMA operations. The host memory 206 may include an on-chip or off-chip memory, such as, Static Random Access Memory (SRAM), Dynamic Random Access Memory (DRAM), High Bandwidth Memory (HBM), non-volatile memory such as storage class memory (SCM) and flash memory.

The first IC device 214 may include a data buffer 216 and a message buffer 214. The data buffer 216 and the message buffer 218 may be part of the local memory of the first IC device 218. The local memory may include an on-chip or off-chip memory, such as, HBM, SRAM, or DRAM. In some implementations, the data buffer 216 and the message buffer 218 can be implemented using different memory types. For example, the data buffer 216 can be implemented using the HBM, and the message buffer 218 can be implemented using registers. The data buffer 216 can be used to store the transaction data associated with various computations. The message buffer 218 can be used to store various messages or requests received by the first IC device 214 via the interconnect 208. In some implementations, the data buffer 216 and the message buffer 218 may be mapped to different address ranges that can be accessible by the host processor 204 and the second IC device 212. In some examples, the data buffer 216 may be mapped to a Base Address Register (BAR) in the PCIe configuration space of the host processor 204.

In some implementations, the interconnect 208 can be a PCIe switch and the transactions between different components of the apparatus 200 may be performed using Transaction Layer Packets (TLPs). Each TLP may include a TLP header comprising information associated with the transaction, e.g., a TLP packet type, an RO bit, and IDO bit, and other fields that are not covered in this specification for ease of discussion. The TLP packet type may indicate whether the transaction corresponds to a memory write/read request, message request with or without data, I/O write/read request, configuration write/read request, etc. The RO and IDO bits, when 0 or disabled, indicate that the transaction follows strong ordering. When the RO bit is set or enabled, it indicates that the transaction allows relaxed order, or out-of-order completion.

In some instances, the second IC device 212 may be configured to send a set of transactions to store a set of data into the data buffer 216 using direct memory access to bypass the host processor 204. For example, the set of data may have been computed by a remote data processing device in a distributed training environment, and is transmitted to other participating data processing devices. In step 1, the second IC device 212 may send, via the interconnect 208, a first TLP with a write request and the set of data to store the set of data in the data buffer 216 of the first IC device 214. In step 2, the second IC device 212 may send, via the interconnect 208, a second TLP with a write completion message to the host device 202 indicating that the write request in step 1 has been completed. In step 3, the host device 202 may send, via the interconnect 208, a third TLP with a synchronization message to the first IC device 214 indicating that the set of data sent by the second IC device 212 is ready to be consumed.

In various embodiments, the RO and IDO bits in each of the first TLP, the second TLP, and the third TLP can be disabled to indicate strong ordering for the TLPs and enforce the completion of the transactions issued in steps 1, 2, and 3 in the correct order. The PCIe transaction ordering rules can enforce the strong ordering among these TLPs as they traverse through the interconnect 208. Thus, the write request issued by the second IC device 212 in step 1 should not pass the write completion message and the set of data should be stored in the data buffer 216 before the write completion message is stored in the host memory 206. Furthermore, the synchronization message in step 3 should not pass the write completion message and the write request through the interconnect 208. Thus, the synchronization message should be written to the message buffer 216 after the set of data has been stored in the data buffer 216 to maintain the strong transaction ordering.

However, in some cases, the set of data may encounter latency as it traverses through the interconnect 208, and arrive the first IC device 214 later than the synchronization message. For example, the write completion message sent by the second IC device 212 may not encounter much latency through the interconnect 208 and will be received by the host device 202, which may send the synchronization message to the first IC device 214 upon receiving the write completion message. However, due to the flow control mechanisms implemented by the interconnect 208, the set of data may be temporarily stored in an interconnect buffer 210 in the interconnect 208 as it is transferred to the first IC device 214. Thus, to maintain the strong ordering for the TLPs and enforce the completion of the transactions issued in steps 1, 2, and 3 in the correct order, the complete set of data may be flushed to the first IC device 214 before the synchronization message is sent to the first IC device 214.

Some data processing devices (e.g., GPUs) may change the transaction ordering semantics of some of the transactions from SO to RO for performance reasons. For example, some systems may include memories (e.g., HBM) with parallel interfaces to provide higher bandwidth for memory accesses. However, to maintain the strong ordering semantics, memory writes may need to be serialized which can impact the performance. Thus, changing the transaction semantic to RO can allow utilizing the parallel interface without impacting the performance. However, changing the transaction ordering to RO for the first TLP can introduce the race condition with the synchronization message since completion of the write request before storing the synchronization message cannot be guaranteed with the first TLP being RO enabled.

The techniques described herein can be used to ensure data coherency so that the correct and complete set of data is available to the data processing device for the next set of computations by overwriting the transaction ordering of certain transactions based on the target address. In some embodiments, the data buffer 216 may be mapped to an address range that is assigned to transactions that allow relaxed or out-of-order completions, and the message buffer 218 may be mapped to another address range that is assigned to transactions that follow transaction ordering or strong ordering. Mapping different memory sections or buffers to different address ranges that are assigned to different transaction ordering can allow the first IC device 214 to control completion of different transactions in a desired order irrespective of the transaction ordering indicated by the corresponding TLP headers.

Thus, when the first IC device 214 receives the first TLP with the write request, it may determine that this transaction is directed to the data buffer 216 that is mapped to the address range assigned to transactions that allow relaxed ordering, and when the first IC device 214 receives the third TLP with the synchronization message, it may determine that this transaction is directed to the message buffer 218 that is mapped to the address range assigned to transactions that follow transaction ordering. Thus, the transaction that is targeted to the message buffer 216 can enforce the strong ordering by ensuring that the set of data is stored in the data buffer 216 before the synchronization message is written to the message buffer 216. The first IC device 214 may not release the third transaction for execution until the first set of transactions have been completed to ensure that complete and correct set of data is available to be operated on. Thus, the transactions that write to the data buffer 216 can still utilize the parallel interface for memory transactions without compromising on the performance.

Figure 3:
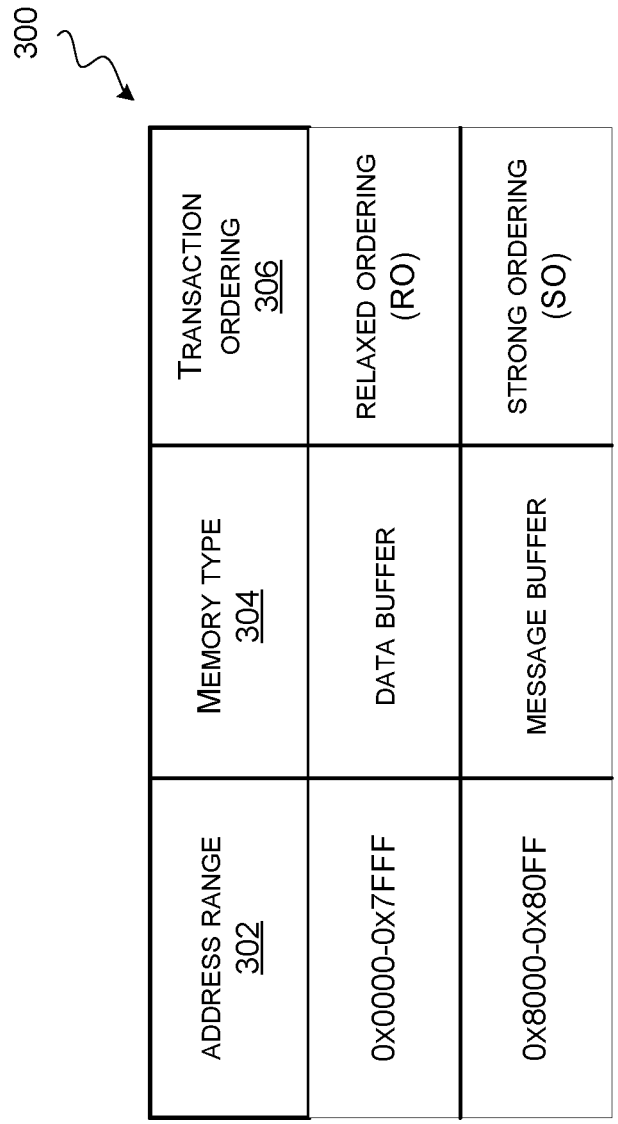
FIG. 3 illustrates an example table with assignment of different address ranges to different transaction orderings, according to some embodiments.

FIG. 3 illustrates an example table 300 with assignment of different address ranges to different transaction orderings, according to some embodiments.

As shown in FIG. 3, the table 300 shows transaction ordering 306 assigned to each memory type 304 that is mapped to a corresponding address range 302. For example, the local memory of the first IC device 214 may be mapped to an address range (e.g., 0x0000-0x8FFF) of the host processor 204, and the data buffer 216 may be mapped to a first address range (e.g., 0x0000-0x07FF) of the first IC device 214, and the message buffer 218 may be mapped to a second address range (e.g., 0x8000-0x80FF) of the first IC device 214. The first address range can be assigned to the transactions that allow out-of-order completions (e.g., relaxed ordering), and the second address range can be assigned to the transactions that follow ordering (e.g., strong ordering).

Figure 4:
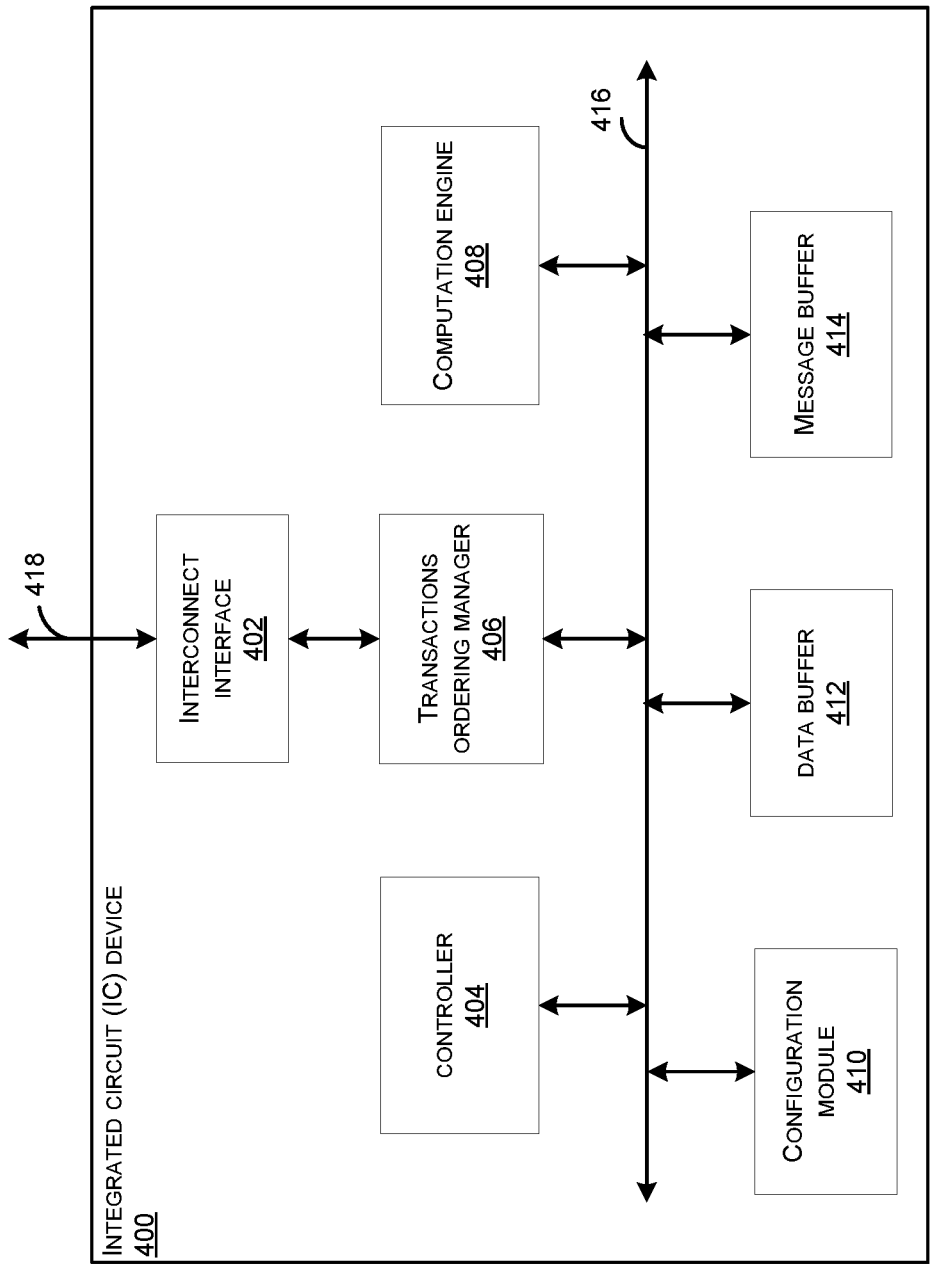
FIG. 4 illustrates an IC device, according to some embodiments.

FIG. 4 illustrates an integrated circuit (IC) device 400, according to some embodiments. The IC device 400 can be an example of the first IC device 214 or the data processing devices 110a-110n.

The IC device 400 may include an interconnect interface 402, a controller 404, a transactions ordering manager 406, a computation engine 408, a configuration module 410, a data buffer 412, and a message buffer 414. The controller 404, transactions ordering manager 406, computation engine 408, configuration module 410, data buffer 412, and the message buffer 414 may be configured to communicate with one another using a bus 416 based on any suitable bus protocol, e.g., Advanced eXtensible Interface (AXI). The data buffer 412 can be similar to the data buffer 216, and the message buffer 414 can be similar to the message buffer 218. The data buffer 412 can be implemented using an HBM, DRAM, SRAM, etc. The message buffer 414 can be implemented using queues, flip-flops, registers, or other memory types. The data buffer 412 may be mapped to a first address range of the host processor 204, and the message buffer 414 may be mapped to a second address range of the host processor 204, similar to the address ranges described in the table 300.

The interconnect interface 402 may be configured to communicate with the interconnect 208 via a bus 416. For example, the interconnect interface 402 may communicate with a PCIe switch (e.g., the interconnect 208) using a PCIe bus to exchange messages and data with the second IC device 212 and the host device 202. In some examples, the interconnect interface 402 may be used to receive the first TLP with the write request initiated by the second IC device 212 to store the set of data in the data buffer 412, and the third TLP with the synchronization message initiated by the host device 202. The interconnect interface 402 may include ports, switches, buffers, queues, and/or other components based on the implementation.

The transactions ordering manager 406 may be configured to manage transaction ordering for the TLPs received or transmitted by the data processing device 400 via the interconnect interface 402. The transactions ordering manager 406 may buffer each TLP, and based on the target address for the given TLP may treat that TLP as RO enabled or SO enabled irrespective of the value of the RO/IDO bits in the TLP header. If the TLP is targeted for the RO enabled address space then the transaction can be released for execution, and if the transaction is targeted for the SO enabled address space, then the transaction is held back in the buffer to ensure that all the outstanding transactions issued before this transaction are completed before this transaction can be released for execution. Thus, the set of first transactions to write the set of data into the data buffer 412 can be treated as RO enabled based on the address mapping of the data buffer 412 and can be released for execution. The transaction to write the synchronization message to the message buffer 414 can be treated as the SO enabled based on the address mapping of the message buffer 414 and is held back in the buffer until the set of first transactions to store the set of data into the data buffer 216 has been completed. Thus, the transactions ordering manager 406 may ensure that the set of first transactions to store the set of data into the data buffer 412 is executed before the synchronization message is released for execution.

The controller 404 may be configured to communicate with the second IC device 212 and the host device 202 via the interconnect interface 402, and manage the operations of various components of the data processing device 400. For example, the controller 404 may fetch and execute different requests/messages from the transactions ordering manager 406 based on the ordering determined by the transactions ordering manager 406. The controller 404 may also control the computation engine 408 to start the computation operation based on the set of data stored in the data buffer 412 upon executing the transaction to write the synchronization message to the message buffer 414.

The computation engine 408 may be configured to perform various computations based on the application executing on the host processor 204. In some examples, the computation engine 408 may be an accelerator that can perform neural network computations. The computations may include addition, subtraction, matrix multiplications, among other operations.

The configuration module 410 may include a configuration register comprising the assignment of different address ranges, which can be used by the transactions ordering manager 406 for treating the transactions as RO enabled or SO enabled. For example, the configuration register may include the transaction ordering assignments as described with reference to the table 300. In some implementations, the configuration register can be programmed by the host device 102 at initialization.

Figure 5:
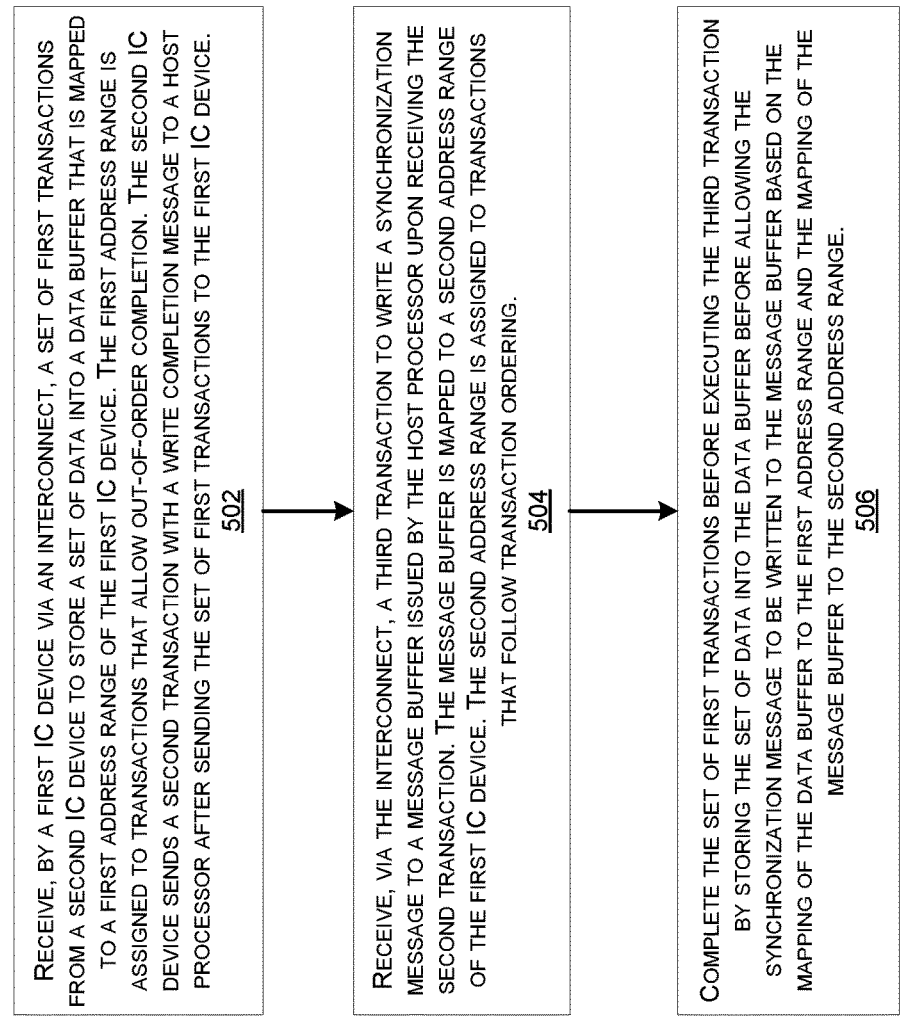
FIG. 5 illustrates an example flow chart for a method that can be performed by a first IC device, according to some embodiments.

FIG. 5 illustrates an example flow chart 500 for a method that can be performed by a first IC device, according to some embodiments. For example, the first IC device can be the first IC device 214 or the first IC device 400.

In step 502, the method includes receiving, by a first IC device via an interconnect, a set of first transactions from a second IC device to store a set of data into a data buffer that is mapped to a first address range. The second IC device can be the second IC device 212. As discussed with reference to step 1 in FIG. 2, the first IC device 214 may receive a set of first transactions from the second IC device 212 to store a set of data into the data buffer 216. The second IC device 212 can be a network device and may have received the set of data from a remote computing device over the network. The first IC device 214 can be a data processing device that can use the set of data for computations. The data buffer 216 may be mapped to a first address range of the first IC device. As described with reference to the table 300, the first address range may be assigned to transactions that allow out-of-order completion (e.g., relaxed ordering). The second IC device 212 may send a second transaction with a write completion message to the host processor 204 after sending the set of first transactions to the first IC device 214, as described with reference to step 2 in FIG. 2. The set of first transactions and the second transaction may include corresponding TLP headers with the RO and the IDO bits disabled (e.g., strong ordering).

In step 504, the method includes receiving, via the interconnect, a third transaction to write a synchronization message to a message buffer issued by the host processor upon receiving the second transaction. The first IC device 214 may receive the third transaction to write the synchronization message to the message buffer 218. The third transaction may be issued by the host processor 204 upon receiving the second transaction from the second IC device 212, as described with reference to step 3 in FIG. 2. The message buffer 218 may be mapped to a second address range of the first IC device 214, which may be assigned to transactions that follow transaction ordering (e.g., strong ordering).

In step 506, the method includes completing the set of first transactions before executing the third transaction by storing the set of data into the data buffer before allowing the synchronization message to be written to the message buffer based on the mapping of the data buffer to the first address range and the mapping of the message buffer to the second address range. The first IC device 214 may complete the set of first transactions before executing the third transaction by storing the set of data into the data buffer 216 before allowing the synchronization message to be written to the message buffer 218. As described with reference to FIG. 4, the transactions ordering manager 406 of the first IC device 214 may buffer the first TLP and the third TLP, and based on the target address of the first TLP corresponding to the first address range may treat the set of first transactions as the RO enabled, and the target address of the third TLP corresponding to the second address range may treat the third transaction as the SO enabled irrespective of the value of the RO/IDO bits in the TLP headers for the set of first transactions and the third transaction.

The transactions ordering manager 406 may hold back writing to the message buffer 218 to ensure that all the outstanding transactions issued before the third transaction are completed, and the third transaction can be released for execution. Thus, the controller 404 may complete the set of first transactions by writing to the set of data in the data buffer 216 to maintain data coherency before the synchronization message is stored in the message buffer 218. The controller 404 may also control the computation engine 408 to start the computation operation based on the set of data stored in the data buffer 412 upon executing the transaction to write the synchronization message to the message buffer 414.

Thus, various embodiments can be used to enforce transaction ordering based on the target address of each transaction irrespective of the transaction ordering indicated by the given transaction, which can ensure data coherency for certain write transactions. For each address range that is mapped to the address space of the host processor 204, a corresponding transaction ordering can be assigned at the initialization of the computing device 100, or before the data transfers are performed between the computing devices.

Figure 6:
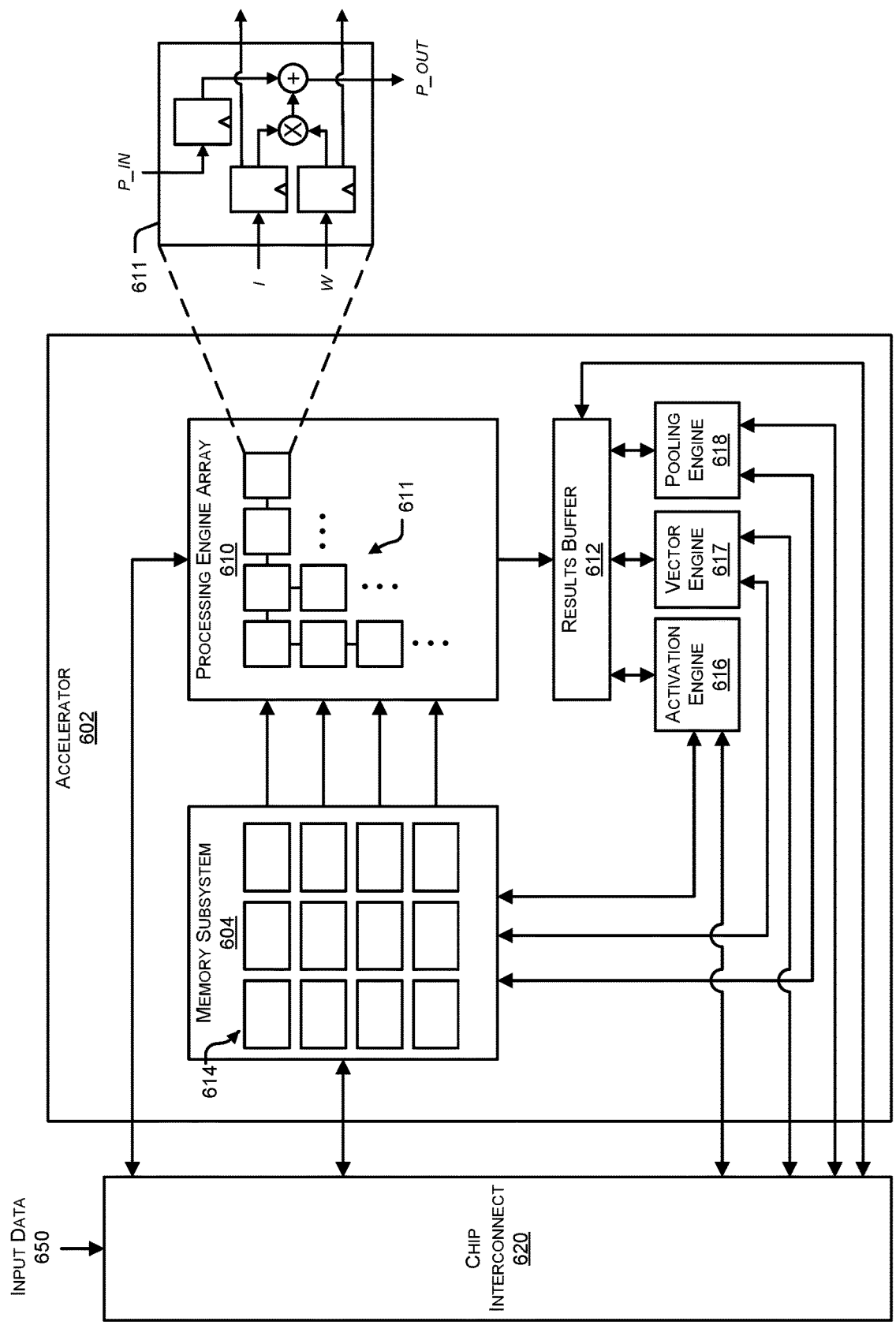
FIG. 6 illustrates a block diagram of an example of an IC device.

FIG. 6 is a block diagram illustrating an example of an integrated circuit device that can include a first IC device 214. The example of FIG. 6 illustrates an accelerator 602, which can be an example of a data processing device. In various examples, the accelerator 602, for a set of input data (e.g., input data 650), can execute computations using a processing engine array 610, an activation engine 616, a vector engine 617, and/or a pooling engine 618. In some examples, the example accelerator 602 may be an integrated circuit component of a processor, such as a neural network processor. The processor may have other integrated circuit components, including additional accelerator engines.

In various implementations, the memory subsystem 604 can include multiple memory banks 614. Memory subsystem 604 can also be referred to as a state buffer. In some examples, the memory subsystem 604 may include the data buffer 216 and the message buffer 218. In these implementations, each memory bank 614 can be independently accessible, meaning that the read of one memory bank is not dependent on the read of another memory bank. Similarly, writing to one memory bank does not affect or limit writing to a different memory bank. In some cases, each memory bank can be read and written at the same time. Various techniques can be used to have independently accessible memory banks 614. For example, each memory bank can be a physically separate memory component that has an address space that is separate and independent of the address spaces of each other memory bank. In this example, each memory bank may have at least one read channel and may have at least one separate write channel that can be used at the same time. In these examples, the memory subsystem 604 can permit simultaneous access to the read or write channels of multiple memory banks. As another example, the memory subsystem 604 can include arbitration logic such that arbitration between, for example, the outputs of multiple memory banks 614 can result in more than one memory bank's output being used. In these and other examples, though globally managed by the memory subsystem 604, each memory bank can be operated independently of any other.

Having the memory banks 614 be independently accessible can increase the efficiency of the accelerator 602. For example, values can be simultaneously read and provided to each row of the processing engine array 610, so that the entire processing engine array 610 can be in use in one clock cycle. As another example, the memory banks 614 can be read at the same time that results computed by the processing engine array 610 are written to the memory subsystem 604. In contrast, a single memory may be able to service only one read or write at a time. With a single memory, multiple clock cycles can be required, for example, to read input data for each row of the processing engine array 610 before the processing engine array 610 can be started.

In various implementations, the memory subsystem 604 can be configured to simultaneously service multiple clients, including the processing engine array 610, the activation engine 616, the vector engine 617, the pooling engine 618, and any external clients that access the memory subsystem 604 over a communication fabric 620. In some implementations, being able to service multiple clients can mean that the memory subsystem 604 has at least as many memory banks as there are clients. In some cases, each row of the processing engine array 610 can count as a separate client. In some cases, each column of the processing engine array 610 can output a result, such that each column can count as a separate write client. In some cases, output from the processing engine array 610 can be written into the memory banks 614 that can then subsequently provide input data for the processing engine array 610. As another example, the activation engine 616, the vector engine 617, and the pooling engine 618 can include multiple execution channels, each of which can be separate memory clients. The memory banks 614 can be implemented, for example, using static random access memory (SRAM).

In various implementations, the memory subsystem 604 can include control logic. The control logic can, for example, keep track of the address spaces of each of the memory banks 614, identify memory banks 614 to read from or write to, and/or move data between the memory banks 614. In some implementations, memory banks 614 can be hardwired to particular clients. For example, a set of memory banks 614 can be hardwired to provide values to the rows of the processing engine array 610, with one memory bank servicing each row. As another example, a set of memory banks can be hard wired to receive values from columns of the processing engine array 610, with one memory bank receiving data for each column.

The processing engine array 610 is the computation matrix of the example accelerator 602. The processing engine array 610 can be an example of the computation engine 408. The processing engine array 610 can, for example, execute parallel integration, convolution, correlation, and/or matrix multiplication, among other things. The processing engine array 610 includes multiple processing engines 611, arranged in rows and columns, such that results output by one processing engine 611 can be input directly into another processing engine 611. Processing engines 611 that are not on the outside edges of the processing engine array 610 thus can receive data to operate on from other processing engines 611, rather than from the memory subsystem 604.

In various examples, the processing engine array 610 uses systolic execution, in which data arrives at each processing engine 611 from different directions at regular intervals. In some examples, input data can flow into the processing engine array 610 from the left and weight values can be loaded at the top. In some examples weights and input data can flow from the left and partial sums can flow from top to bottom. In these and other examples, a multiply-and-accumulate operation moves through the processing engine array 610 as a diagonal wave front, with data moving to the right and down across the array. Control signals can be input at the left at the same time as weights, and can flow across and down along with the computation.

In various implementations, the number of columns in the processing engine array 610 determines the computational capacity of the processing engine array 610, and the number of rows determines the required memory bandwidth for achieving maximum utilization of the processing engine array 610. The processing engine array 610 can have, for example, 64 columns and 128 rows, or some other number of columns and/or rows.

An example of a processing engine 611 is illustrated in FIG. 6 in an inset diagram. As illustrated by this example, a processing engine 611 can include a multiplier-accumulator circuit. Inputs from the left can include, for example, input data i and a weight value w, where the input data is a value taken from either a set of input data or a set of intermediate results, and the weight value is from a set of weight values that connect one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing engine 611.

In the illustrated example, an input from above can include a partial sum, pin, provided either from another processing engine 611 or from a previous round of computation by the processing engine array 610. When starting a computation for a new set of input data, the top row of the processing engine array 610 can receive a fixed value for p_in, such as zero. As illustrated by this example, i and w are multiplied together and the result is summed with p_in to produce a new partial sum, p_out, which can be input into another processing engine 611. Various other implementations of the processing engine 611 are possible.

Outputs from the last row in the processing engine array 610 can be temporarily stored in the results buffer 612. The results can be intermediate results, which can be written to the memory banks 614 to be provided to the processing engine array 610 for additional computation. Alternatively, the results can be final results, which, once written to the memory banks 614 can be read from the memory subsystem 604 over the communication fabric 620, to be output by the system.

In some implementations, the accelerator 602 includes an activation engine 616. In these implementations, the activation engine 616 can combine the results from the processing engine array 610 into one or more output activations. For example, for a convolutional neural network, convolutions from multiple channels can be summed to produce an output activation for a single channel. In other examples, accumulating results from one or more columns in the processing engine array 610 may be needed to produce an output activation for a single node in the neural network. In some examples, activation engine 616 can be bypassed.

In various examples, the activation engine 616 can include multiple separate execution channels. In these examples, the execution channels can correspond to the columns of the processing engine array 610, and can perform an operation on the outputs of a column, the result of which can be stored in the memory subsystem 604. In these examples, the activation engine 616 may be able to perform between 1 and n parallel computations, where n is equal to the number of columns in the processing engine array 610. In some cases, one or more of the computations can be performed simultaneously. Examples of computations that each execution channel can perform include exponentials, squares, square roots, identities, binary steps, bipolar steps, sigmoidals, and ramps, among other examples.

In some implementations, the accelerator 602 can include a pooling engine 618. Pooling is the combining of outputs of the columns of the processing engine array 610. Combining can include for example, computing a maximum value, a minimum value, an average value, a median value, a summation, a multiplication, or another logical or mathematical combination. In various examples, the pooling engine 618 can include multiple execution channels that can operating on values from corresponding columns of the processing engine array 610. In these examples, the pooling engine 618 may be able to perform between 1 and n parallel computations, where n is equal to the number of columns in the processing engine array 610. In various examples, execution channels of the pooling engine 618 can operate in parallel and/or simultaneously. In some examples, the pooling engine 618 can be bypassed.

In some implementations, the accelerator 602 can further include a vector engine 617. Vector engine 617 is a compute engine that can perform computations and manipulations on values stored in memory subsystem 604 and/or results buffer 612 such as values representing matrices of input values, weight values, intermediate results, etc. Vector engine 617 can include multiple execution channels each with a pipeline of computation circuit blocks (e.g., arithmetic logic units) to perform complex computations such as nested multiply-and-add operations and/or complex manipulations such as sorting operations. In various examples, execution channels of the vector engine 617 can operate in parallel and/or simultaneously. In some examples, the vector engine 617 can be bypassed or be omitted.

Herein, the activation engine 616, the vector engine 617, and the pooling engine 618 may be referred to collectively as execution engines. The processing engine array 610 is another example of an execution engine. Another example of an execution engine is a Direct Memory Access (DMA) engine, which may be located outside the accelerator 602.

Input data 650 can arrive over the communication fabric 620. The communication fabric 620 can connect the accelerator 602 to other components of a processor, such as a DMA engine that can obtain input data 650 from an Input/Output (I/O) device, a storage drive, or a network interface. The input data 650 can be, for example one-dimensional data, such as a character string or numerical sequence, or two-dimensional data, such as an array of pixel values for an image or frequency and amplitude values over time for an audio signal. In some examples, the input data 650 can be three-dimensional, as may be the case with, for example, the situational information used by a self-driving car or virtual reality data. In some implementations, the memory subsystem 604 can include a separate buffer for the input data 650. In some implementations, the input data 650 can be stored in the memory banks 614 when the accelerator 602 receives the input data 650.

In some examples, the accelerator 602 can implement a neural network processing engine. In these examples, the accelerator 602, for a set of input data 650, can execute a neural network to perform a task for which the neural network was trained. Executing a neural network on a set of input data can be referred to as inference or performing inference.

The weights for the neural network can be stored in the memory subsystem 604, along with input data 650 on which the neural network will operate. The neural network can also include instructions, which can program the processing engine array 610 to perform various computations on the weights and the input data. The instructions can also be stored in the memory subsystem 604, in the memory banks 614 or in a separate instruction buffer. The processing engine array 610 can output intermediate results, which represent the outputs of individual layers of the neural network. In some cases, the activation engine 616, the vector engine 617, and/or pooling engine 618 may be enabled for computations called for by certain layers of the neural network. The accelerator 602 can store the intermediate results in the memory subsystem 604 for inputting into the processing engine array 610 to compute results for the next layer of the neural network. The processing engine array 610 can further output final results from a last layer of the neural network. The final results can be stored in the memory subsystem 604 and then be copied out to host processor memory or to another location.

Figure 7:
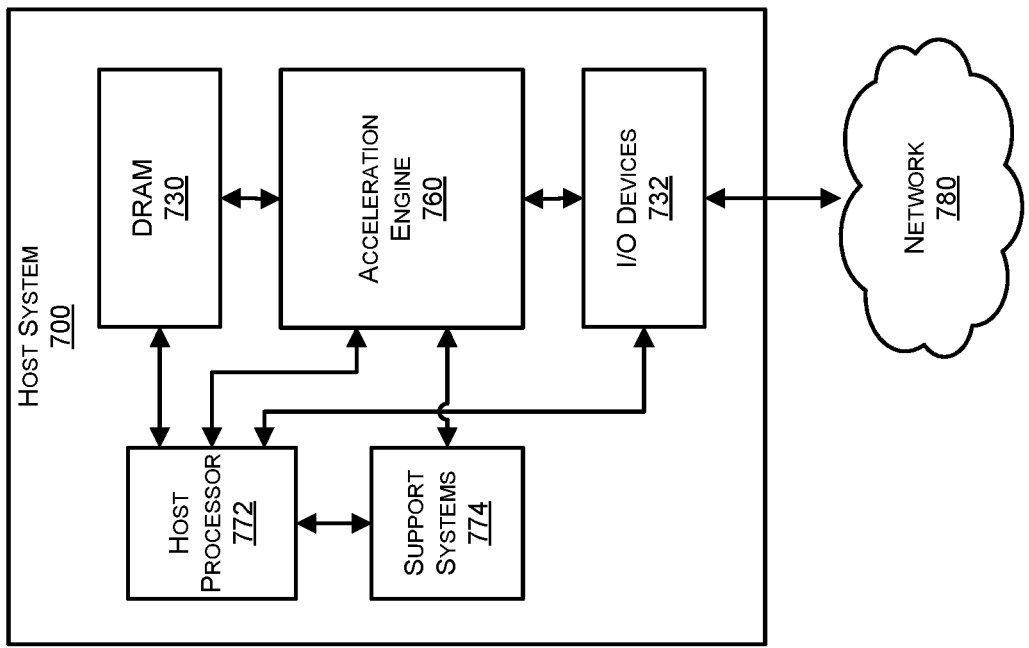
FIG. 7 illustrates a block diagram of an example of a host system.

FIG. 7 includes a block diagram that illustrates an example of a host system 700 in which an acceleration engine 760 can be used. The example host system 700 of FIG. 7 includes an acceleration engine 760, a host processor 772, DRAM 730 or processor memory, I/O devices 732, and support systems 774. In various implementations, the host system 700 can include other hardware that is not illustrated here. The acceleration engine 760 is an example of an integrated circuit that can include one or more accelerators such as the accelerator 602 as described in FIG. 6.

The host processor 772 is a general-purpose integrated circuit that is capable of executing program instructions. In some examples, the host processor 772 can include multiple processing cores. A multi-core processor may include multiple processing units within the same processor. In some examples, the host system 700 can include more than one host processor 772. In some examples, the host processor 772 and the acceleration engine 760 can be one chip, such as, one or more integrated circuits within the same package.

In various examples, the host processor 772 can communicate with other components in the host system 700 over one or more communication channels. For example, the host system 700 can include a host processor bus, which the host processor 772 can use to communicate with the DRAM 730, for example. As another example, the host system 700 can include an I/O bus, such as a PCI-based bus, over which the host processor 772 can communicate with the acceleration engine 760 and/or the I/O devices 732, for example. In various examples, the host system 700 can, alternatively or additionally, include other communication channels or busses, such as serial busses, power management busses, storage device busses, and so on.

In some examples, software programs executing on the host processor 772 can receive or generate input for processing by the acceleration engine 760. In some examples, the programs can select an appropriate neural network to execute for a given input. For example, a program may be for language translation, and can select one or more neural networks capable of speech recognition and/or machine translation. In these and other examples, the programs can configure the acceleration engine 760 with the neural network to execute, and/or can select a neural network processing engine on the acceleration engine 760 that has previously been configured to execute the desired neural network. In some examples, once the acceleration engine 760 has started an inference on input data, the host processor 772 can manage the movement of data (such as weights, instructions, intermediate results, results of conditional layers, and/or final results) into or out of the acceleration engine 760.

In some examples, a software program that is using the acceleration engine 760 to conduct an inference can read the result from a conditional layer from the acceleration engine 760 and/or from a storage location, such as in DRAM 730. In these examples, the program can determine what action the neural network should take next. For example, the program can determine to terminate the inference. As another example, the program can determine to change the direction of the inference, which can be translated by lower level code and/or the neural network processor to a next layer to execute. In these and other examples, the execution flow of the neural network can be coordinated by software.

The DRAM 730 is memory that is used by the host processor 772 for storage of program code that the host processor 772 is in the process of executing, as well as values that are being operated on. In some examples, the data for a neural network (e.g., weight values, instructions, and other data) can be all or partially stored in the DRAM 730. DRAM is a common term for processor memory, and though DRAM is volatile memory, processor memory can be volatile and/or non-volatile. Though not illustrated here, the host system 700 can include other volatile and non-volatile memories for other purposes. For example, the host system 700 can include a Read-Only Memory (ROM) that stores boot code for booting the host system 700 at power on, and/or Basic Input/Output System (BIOS) code.

Though not illustrated here, the DRAM 730 can store instructions for various programs, which can be loaded into and be executed by the host processor 772. For example, the DRAM 730 can be storing instructions for an operating system, one or more data stores, one or more application programs, one or more drivers, and/or services for implementing the features disclosed herein.

The operating system can manage and orchestrate the overall operation of the host system 700, such as scheduling tasks, executing applications, and/or controller peripheral devices, among other operations. In some examples, a host system 700 may host one or more virtual machines. In these examples, each virtual machine may be configured to execute its own operating system. Examples of operating systems include Unix, Linux, Windows, Mac OS, iOS, Android, and the like. The operating system may, alternatively or additionally, be a proprietary operating system.

The data stores can include permanent or transitory data used and/or operated on by the operating system, application programs, or drivers. Examples of such data include web pages, video data, audio data, images, user data, and so on. The information in the data stores may, in some examples, be provided over the network(s) to user devices. In some cases, the data stores may additionally or alternatively include stored application programs and/or drivers. Alternatively or additionally, the data stores may store standard and/or proprietary software libraries, and/or standard and/or proprietary application user interface (API) libraries. Information stored in the data stores may be machine-readable object code, source code, interpreted code, or intermediate code.

The drivers can include programs that provide communication between components in the host system 700. For example, some drivers can provide communication between the operating system and peripheral devices or I/O devices 732. Alternatively or additionally, some drivers may provide communication between application programs and the operating system, and/or application programs and peripheral devices accessible to the host system 700. In many cases, the drivers can include drivers that provide well-understood functionality (e.g., printer drivers, display drivers, hard disk drivers, Solid State Device drivers, etc.). In other cases, the drivers may provide proprietary or specialized functionality.

The I/O devices 732 can include hardware for connecting to user input and output devices, such as keyboards, mice, pens, tablets, voice input devices, touch input devices, displays or monitors, speakers, and printers, among other devices. The I/O devices 732 can also include storage drives and/or network interfaces for connecting to a network 780. For example, the host system 700 can use a network interface to communicate with storage devices, user terminals, other computing devices or servers, and/or other networks, among various examples.

In various examples, one or more of the I/O devices 732 can be storage devices. In these examples, the storage devices include non-volatile memory and can store program instructions and/or data. Examples of storage devices include magnetic storage, optical disks, solid state disks, flash memory, and/or tape storage, among others. The storage device can be housed in the same chassis as the host system 700 or may be in an external enclosure. A storage device can be fixed (e.g., attached by screws) or removable (e.g., having a physical release mechanism and possibly a hot-plug mechanism).

Storage devices, the DRAM 730, and any other memory component in the host system 700 are examples of computer-readable storage media. Computer-readable storage media are physical mediums that are capable of storing data in a format that can be read by a device such as the host processor 772. Computer-readable storage media can be non-transitory. Non-transitory computer-readable media can retain the data stored thereon when no power is applied to the media. Examples of non-transitory computer-readable media include ROM devices, magnetic disks, magnetic tape, optical disks, flash devices, and solid state drives, among others. As used herein, computer-readable storage media does not include computer-readable communication media.

In various examples, the data stored on computer-readable storage media can include program instructions, data structures, program modules, libraries, other software program components, and/or other data that can be transmitted within a data signal, such as a carrier wave or other transmission. The computer-readable storage media can, additionally or alternatively, include documents, images, video, audio, and other data that can be operated on or manipulated through the use of a software program.

In various examples, one or more of the I/O devices 732 can be PCI-based devices. In these examples, a PCI-based I/O device includes a PCI interface for communicating with the host system 700. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device, to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe.

A PCI-based device can include one or more functions. A "function" describes the hardware and/or software of an operation that may be provided by the PCI-based device. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some examples, the PCI-based device can include single-root I/O virtualization (SR-IOV). SR-IOV is an extended capability that may be included in a PCI-based device. SR-IOV allows a physical resource (e.g., a single network interface controller) to appear as multiple virtual resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

In various implementations, the support systems 774 can include hardware for coordinating the operations of the acceleration engine 760. For example, the support systems 774 can include a microprocessor that coordinates the activities of the acceleration engine 760, including moving data around on the acceleration engine 760. In this example, the microprocessor can be an integrated circuit that can execute microcode. Microcode is program code that can enable an integrated circuit to have some flexibility in the operations that the integrated circuit can execute, but because the program code uses a limited instruction set, the microprocessor may have more limited capability than the host processor 772. In some examples, the program executed by the microprocessor is stored on the hardware of microprocessor, or on a non-volatile memory chip in the host system 700. In some examples, the microprocessor and the acceleration engine 760 can be on chip, such as one integrated circuit on the same die and in the same package.

In some examples, the support systems 774 can be responsible for taking instructions from the host processor 772 when programs executing on the host processor 772 request the execution of a neural network. For example, the host processor 772 can provide the support systems 774 with a set of input data and a task that is to be performed on the set of input data. In this example, the support systems 774 can identify a neural network that can perform the task, and can program the acceleration engine 760 to execute the neural network on the set of input data. In some examples, the support systems 774 only needs to select an appropriate neural network processing engine of the neural network processor. In some examples, the support systems 774 may need to load the data for the neural network onto the acceleration engine 760 before the acceleration engine 760 can start executing the neural network. In these and other examples, the support systems 774 can further receive the output of executing the neural network, and provide the output back to the host processor 772.

In some examples, the operations of the support systems 774 can be handled by the host processor 772. In these examples, the support systems 774 may not be needed and can be omitted from the host system 700.

In various examples, the host system 700 can include a combination of host systems, processor nodes, storage subsystems, and I/O chassis that represent user devices, service provider computers or third-party computers.

User devices can include computing devices to access an application (e.g., a web browser or mobile device application). In some examples, the application may be hosted, managed, and/or provided by a computing resources service or service provider. The application may enable a user to interact with the service provider computer to, for example, access web content (e.g., web pages, music, video, etc.). The user device may be a computing device such as, for example, a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device may be in communication with the service provider computer over one or more networks. Additionally, the user device may be part of the distributed system managed by, controlled by, or otherwise part of the service provider computer (e.g., a console device integrated with the service provider computers).

The host system 700 can also represent one or more service provider computers. A service provider computer may provide a native application that is configured to run on user devices, which users may interact with. The service provider computer may, in some examples, provide computing resources such as, but not limited to, client entities, low latency data storage, durable data storage, data access, management, virtualization, cloud-based software solutions, electronic content performance management, and so on. The service provider computer may also be operable to provide web hosting, databasing, computer application development and/or implementation platforms, combinations of the foregoing or the like. In some examples, the service provider computer may be provided as one or more virtual machines implemented in a hosted computing environment. The hosted computing environment can include one or more rapidly provisioned and released computing resources. These computing resources can include computing, networking and/or storage devices. A hosted computing environment may also be referred to as a cloud computing environment. The service provider computer may include one or more servers, perhaps arranged in a cluster, as a server farm, or as individual servers not associated with one another, and may host application and/or cloud-based software services. These servers may be configured as part of an integrated, distributed computing environment. In some examples, the service provider computer may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer may communicate with one or more third party computers.

Figure 8:
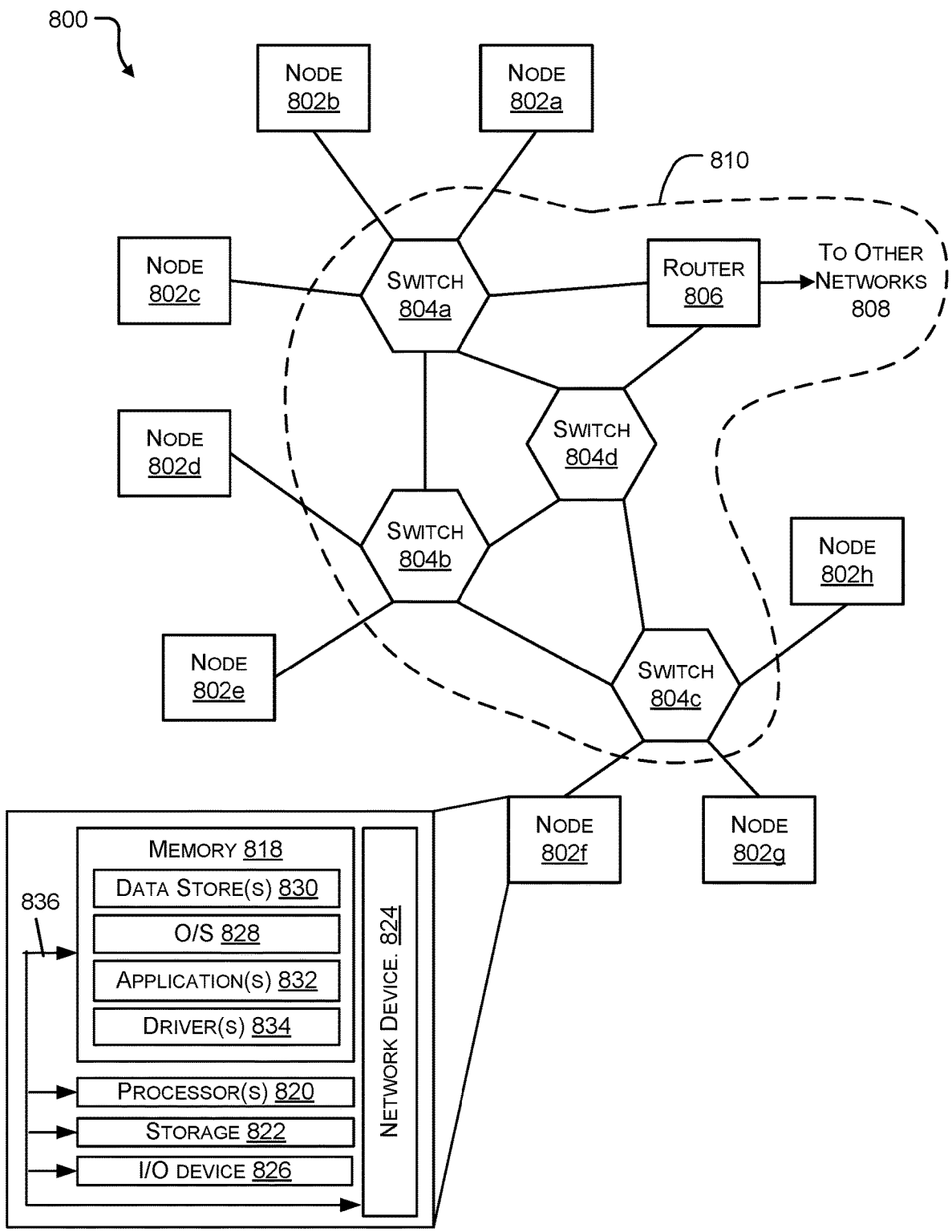
FIG. 8 illustrates a conceptual diagram of an example network.

FIG. 8 includes a diagram of an example network 800, which can include one or more host systems, such as the host system illustrated in FIG. 7. For example, the example network 800 of FIG. 8 includes multiple nodes 802*a*-802*h*, one or more of which can be a host system such as is illustrated in FIG. 7. Others of the nodes 802*a*-802*h* can be other computing devices, each of which include at least a memory for storing program instructions, a processor for executing the instructions, and a network interface for connecting to the network 800. In some examples, the computing device 100 can be one of the nodes 802a-802h.

In various examples, the network 800 can be used to process data. For example, input data can be received at one of the nodes 802a-802h or from other networks 808 with which the network 800 can communicate. In this example, the input data can be directed to a node in the network 800 that includes an acceleration engine, for the acceleration engine to operate on and produce a result. The result can then be transferred to the node or other network from which the input data was received. In various examples, input data can be accumulated from various sources, including one or more of the nodes 802a-802h and/or computing devices located in the other networks 808, and the accumulated input data can be directed to one or more host systems in the network 800. Results from the host systems can then be distributed back to the sources from which the input data was gathered.

In various examples, one or more of the nodes 802a-802h can be responsible for operations such as accumulating input data for host systems to operate on, keeping track of which host systems are busy and which can accept more work, determining whether the host systems are operating correctly and/or most efficiently, monitoring network security, and/or other management operations.

In the example of FIG. 8, the nodes 802a-802h are connected to one another using a switched architecture with point-to point links. The switched architecture includes multiple switches 804a-804d, which can be arranged in a multi-layered network such as a Clos network. A network device that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. The switches 804a-804d of FIG. 8 may be connected to the nodes 802a-802h and provide multiple paths between any two nodes.

The network 800 may also include one or more network devices for connection with other networks 808, such as a router 806. Routers use headers and forwarding tables to determine the best path for forwarding the packets, and use protocols such as internet control message protocol (ICMP) to communicate with each other and configure the best route between any two devices. The router 806 of FIG. 8 can be used to connect to other networks 808 such as subnets, LANs, wide area networks (WANs), and/or the Internet.

In some examples, network 800 may include any one or a combination of many different types of networks, such as cable networks, the Internet, wireless networks, cellular networks and other private and/or public networks. The interconnected switches 804a-804d and the router 806, if present, may be referred to as a switch fabric 810, a fabric, a network fabric, or simply a network. In the context of a computer network, terms "fabric" and "network" may be used interchangeably herein.

The nodes 802a-802h may be any combination of host systems, processor nodes, storage subsystems, and I/O chassis that represent user devices, service provider computers or third party computers.

User devices may include computing devices to access an application 832 (e.g., a web browser or mobile device application). In some aspects, the application 832 may be hosted, managed, and/or provided by a computing resources service or service provider. The application 832 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 808. Additionally, the user device(s) may be part of the distributed system managed by, controlled by, or otherwise part of the service provider computer(s) (e.g., a console device integrated with the service provider computers).

The node(s) of FIG. 8 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some examples, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 832 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 802a-802h may include at least one memory 818 and one or more processing units (or processor(s) 820). The processor(s) 820 may be implemented in hardware, computer-executable instructions, firmware, or combinations thereof. Computer-executable instruction or firmware implementations of the processor(s) 820 may include computer-executable or machine-executable instructions written in any suitable programming language to perform the various functions described.

In some instances, the hardware processor(s) 820 may be a single core processor or a multi-core processor. A multi-core processor may include multiple processing units within the same processor. In some examples, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 818 may store program instructions that are loadable and executable on the processor(s) 820, as well as data generated during the execution of these programs. Depending on the configuration and type of the node(s) 802a-802h, the memory 818 may be volatile (such as RAM) and/or non-volatile (such as ROM, flash memory, etc.). The memory 818 may include an operating system 828, one or more data stores 830, one or more application programs 832, one or more drivers 834, and/or services for implementing the features disclosed herein.

The operating system 828 may support nodes 802a-802h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 828 may also be a proprietary operating system.

The data stores 830 may include permanent or transitory data used and/or operated on by the operating system 828, application programs 832, or drivers 834. Examples of such data include web pages, video data, audio data, images, user data, and so on. The information in the data stores 830 may, in some implementations, be provided over the network(s) 808 to user devices. In some cases, the data stores 830 may additionally or alternatively include stored application programs and/or drivers. Alternatively or additionally, the data stores 830 may store standard and/or proprietary software libraries, and/or standard and/or proprietary application user interface (API) libraries. Information stored in the data stores 830 may be machine-readable object code, source code, interpreted code, or intermediate code.

The drivers 834 include programs that may provide communication between components in a node. For example, some drivers 834 may provide communication between the operating system 828 and additional storage 822, network device 824, and/or I/O device 826. Alternatively or additionally, some drivers 834 may provide communication between application programs 832 and the operating system 828, and/or application programs 832 and peripheral devices accessible to the service provider computer. In many cases, the drivers 834 may include drivers that provide well-understood functionality (e.g., printer drivers, display drivers, hard disk drivers, Solid State Device drivers). In other cases, the drivers 834 may provide proprietary or specialized functionality.

The service provider computer(s) or servers may also include additional storage 822, which may include removable storage and/or non-removable storage. The additional storage 822 may include magnetic storage, optical disks, solid state disks, flash memory, and/or tape storage. The additional storage 822 may be housed in the same chassis as the node(s) 802a-802h or may be in an external enclosure. The memory 818 and/or additional storage 822 and their associated computer-readable media may provide non-volatile storage of computer-readable instructions, data structures, program modules, and other data for the computing devices. In some implementations, the memory 818 may include multiple different types of memory, such as SRAM, DRAM, or ROM.

The memory 818 and the additional storage 822, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 818 and the additional storage 822 are examples of computer storage media. Additional types of computer storage media that may be present in the node(s) 802a-802h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 802a-802h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 802a-802h may also include I/O device(s) 826, such as a keyboard, a mouse, a pen, a voice input device, a touch input device, a display, speakers, a printer, and the like. The node(s) 802a-802h may also include one or more communication channels 836. A communication channel 836 may provide a medium over which the various components of the node(s) 802a-802h can communicate. The communication channel or channels 836 may take the form of a bus, a ring, a switching fabric, or a network.

The node(s) 802a-802h may also contain network device(s) 824 that allow the node(s) 802a-802h to communicate with a stored database, another computing device or server, user terminals and/or other devices on the network(s) 800.

In some implementations, the network device 824 is a peripheral device, such as a PCI-based device. In these implementations, the network device 824 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module may implement NVMe, and the network device 824 may be connected to a computing system using a PCIe interface.

A PCI-based device may include one or more functions. A "function" describes operations that may be provided by the network device 824. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 824 may include single-root I/O virtualization (SR-IOV). SR-My is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in the preceding figures, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A computing system comprising:
 a host device comprising a host processor;
 a network device coupled to the host device via an interconnect, the network device comprising a network interface to communicate with a remote computing system via a network; and
 an accelerator device coupled to the host device and the network device via the interconnect, the accelerator device comprising a data buffer and a message buffer, wherein the data buffer is mapped to a first address range and the message buffer is mapped to a second address range, and wherein the first address range is assigned to transactions that follow a relaxed-order completion and the second address range is assigned to transactions that follow a strong-order completion,
 wherein the network device is configured to:
  send, via the interconnect, a set of first transactions to store a set of data into the data buffer of the accelerator device without going through the host device; and send, via the interconnect, a second transaction with a write completion message to the host device indicating that the set of data has been sent to the accelerator device,
wherein the host device is configured to:
upon receiving the second transaction, send, via the interconnect, a third transaction with a synchronization message to the accelerator device to initiate computations using the set of data, and
wherein the accelerator device is configured to:
receive, via the interconnect, the set of first transactions from the network device;
receive, via the interconnect, the third transaction from the host device;
treat the set of first transactions as transactions that follow the relaxed-order completion based on mapping of the data buffer to the first address range, and treat the third transaction as a transaction that follows the strong-order completion based on the mapping of the message buffer to the second address range; and
complete the set of first transactions before executing the third transaction by storing the set of data into the data buffer before storing the synchronization message in the message buffer to ensure that a complete set of data is available in the data buffer to be used for the computations.

2. The computing system of claim 1, wherein the interconnect is a switch based on Peripheral Component Interconnect (PCI) protocol, and wherein the set of first transactions, the second transaction, and the third transaction include Transaction Layer Packets (TLPs).

3. The computing system of claim 2, wherein each TLP for the set of first transactions, the second transaction, and the third transaction includes a TLP header comprising a Relaxed Ordering (RO) bit and an ID-based Ordering (IDO) bit that are not set indicating that the transaction follows the strong-order completion.

4. The computing system of claim 3, wherein the accelerator device treats the set of first transactions as transactions that follow the relaxed-order completion and the third transaction as the transaction that follows the strong-order completion irrespective of the RO bit and the IDO bit not being set in a corresponding TLP header.

5. A method performed by a first integrated circuit (IC) device, comprising:
receiving, via an interconnect, a set of first transactions from a second IC device to store a set of data into a data buffer that is mapped to a first address range of the first IC device, the first address range being assigned to transactions that allow out-of-order completion, wherein the second IC device sends a second transaction with a write completion message to a host processor after sending the set of first transactions to the first IC device;
receiving, via the interconnect, a third transaction to write a synchronization message to a message buffer issued by the host processor upon receiving the second transaction, wherein the message buffer is mapped to a second address range of the first IC device, the second address range being assigned to transactions that follow transaction ordering; and
completing the set of first transactions before executing the third transaction in the first IC device by storing the set of data into the data buffer before allowing the synchronization message to be written to the message buffer based on the mapping of the data buffer to the first address range and the mapping of the message buffer to the second address range.

6. The method of claim 5, wherein the first IC device and the second IC device are connected to a same peripheral switch of the interconnect.

7. The method of claim 5, wherein each of the set of first transactions, the second transaction, and the third transaction includes an indication of being a type of transaction that follows transaction ordering, and wherein the set of first transactions is completed before the third transaction irrespective of the type of transaction indicated by the set of first transactions and the third transaction.

8. The method of claim 7, wherein the set of first transactions, the second transaction, and the third transaction include Transaction Layer Packets (TLPs).

9. The method of claim 8, wherein the indication of being the type of transaction that follows transaction ordering is represented using a Relaxed Ordering (RO) bit and an ID-based Ordering (IDO) bit being not set in a TLP header for each corresponding TLP.

10. The method of claim 5, wherein the second IC device is a network device that is configured to receive the set of data from a remote device over a network.

11. The method of claim 5, wherein the first IC device is further configured to perform computations using the set of data stored in the data buffer after the synchronization message is written to the message buffer.

12. The method of claim 5, wherein the first IC device is an accelerator device that is configured to perform computations for a neural network.

13. The method of claim 5, wherein the second IC device sends the set of first transactions to store the set of data into the data buffer of the first IC device using direct memory access to bypass the host processor.

14. The method of claim 5, wherein the data buffer is implemented using a High Bandwidth Memory (HBM).

15. A first integrated circuit (IC) device comprising:
a data buffer to store data for computations, the data buffer being mapped to a first address range of the first IC device that allows transactions to have out-of-order completion;
and
a message buffer to store messages, the message buffer being mapped to a second address range of the first IC device that requires transactions to follow transaction ordering,
wherein the first IC device is configured to:
receive, via an interconnect, a set of first transactions from a second IC device to store a set of data into the data buffer, wherein the second IC device sends a second transaction with a write completion message to a host processor after sending the set of first transactions to the first IC device;
receive, via the interconnect, a third transaction to write a synchronization message to the message buffer issued by the host processor upon receiving the second transaction; and
complete the set of first transactions before executing the third transaction by storing the set of data into the data buffer before allowing the synchronization message to be written to the message buffer based on the mapping of the data buffer to the first address range and the mapping of the message buffer to the second address range.

16. The first IC device of claim 15, wherein the first IC device and the second IC device are Peripheral Component Interconnect (PCI) devices.

17. The first IC device of claim 15, wherein the interconnect includes a PCI switch, and wherein the set of first transactions, the second transaction, and the third transaction include Transaction Layer Packets (TLPs).

18. The first IC device of claim 17, wherein each TLP corresponding to the set of first transactions, the second transaction, and the third transaction includes a Relaxed Ordering (RO) bit and an ID-based Ordering (IDO) bit that are not set indicating that each of the set of first transactions, the second transaction, and the third transaction is a type of transaction that follows transaction ordering.

19. The first IC device of claim 18, wherein the first IC device completes the set of first transactions before the third transaction irrespective of the type of transaction indicated by the set of first transactions and the third transaction.

20. The first IC device of claim 15, wherein the second IC device sends the set of first transactions to store the set of data into the data buffer of the first IC device without going through the host processor.

\* \* \* \* \*